US010853487B2

(12) United States Patent
Rhee et al.

(10) Patent No.: US 10,853,487 B2
(45) Date of Patent: Dec. 1, 2020

(54) PATH-BASED PROGRAM LINEAGE INFERENCE ANALYSIS

(71) Applicants:NEC Laboratories America, Inc., Princeton, NJ (US); NEC Corporation, Tokyo (JP)

(72) Inventors: Junghwan Rhee, Princeton, NJ (US); Zhenyu Wu, Plainsboro, NJ (US); Lauri Korts-Parn, Princeton, NJ (US); Kangkook Jee, Princeton, NJ (US); Zhichun Li, Princeton, NJ (US); Omid Setayeshfar, Athens, GA (US)

(73) Assignee: NEC CORPORATION

( * ) Notice: Subject to any disclaimer, the term of this patent is extended or adjusted under 35 U.S.C. 154(b) by 215 days.

(21) Appl. No.: 16/039,993

(22) Filed: Jul. 19, 2018

(65) Prior Publication Data

US 2019/0050562 A1   Feb. 14, 2019

Related U.S. Application Data

(60) Provisional application No. 62/544,138, filed on Aug. 11, 2017.

(51) Int. Cl.
*G06F 21/55* (2013.01)
*G06F 16/21* (2019.01)
(Continued)

(52) U.S. Cl.
CPC .......... *G06F 21/552* (2013.01); *G06F 16/219* (2019.01); *G06F 16/26* (2019.01);
(Continued)

(58) Field of Classification Search
CPC ...... G06F 21/552; G06F 16/219; G06F 16/26; G06F 16/9024; G06F 21/52; G06F 21/566; G06F 2221/033; H04L 63/1425
See application file for complete search history.

(56) References Cited

U.S. PATENT DOCUMENTS

| 6,266,654 B1 | 7/2001 | Schull | |
|---|---|---|---|
| 2004/0172637 A1* | 9/2004 | Koutyrine | G06F 8/52 719/328 |

(Continued)

OTHER PUBLICATIONS

Jang, Jiyong et al., "Towards Automatic Software Lineage Inference," USENIX Security Symposium, Aug. 2013, pp. 81-96.

*Primary Examiner* — Meng Li
(74) *Attorney, Agent, or Firm* — Joseph Kolodka

(57) ABSTRACT

Systems and methods are disclosed for securing an enterprise environment by detecting suspicious software. A global program lineage graph is constructed. Construction of the global program lineage graph includes creating a node for each version of a program having been installed on a set of user machines. Additionally, at least two nodes are linked with a directional edge. For each version of the program, a prevalence number of the set of user machines on which each version of the program had been installed is determined; and the prevalence number is recorded to the metadata associated with the respective node. Anomalous behavior is identified based on structures formed by the at least two nodes and associated directional edge in the global program lineage graph. An alarm is displayed on a graphical user interface for each suspicious software based on the identified anomalous behavior.

20 Claims, 9 Drawing Sheets

(51) Int. Cl.
*G06F 16/26* (2019.01)
*G06F 16/901* (2019.01)
*G06F 21/52* (2013.01)
*G06F 21/56* (2013.01)
*H04L 29/06* (2006.01)

(52) U.S. Cl.
CPC .......... G06F 16/9024 (2019.01); G06F 21/52 (2013.01); G06F 21/566 (2013.01); H04L 63/1425 (2013.01); *G06F 2221/033* (2013.01)

(56) References Cited

U.S. PATENT DOCUMENTS

2017/0180410 A1* 6/2017 Bach ...................... H04L 67/025
2018/0152468 A1* 5/2018 Nor ....................... H04L 43/045

* cited by examiner

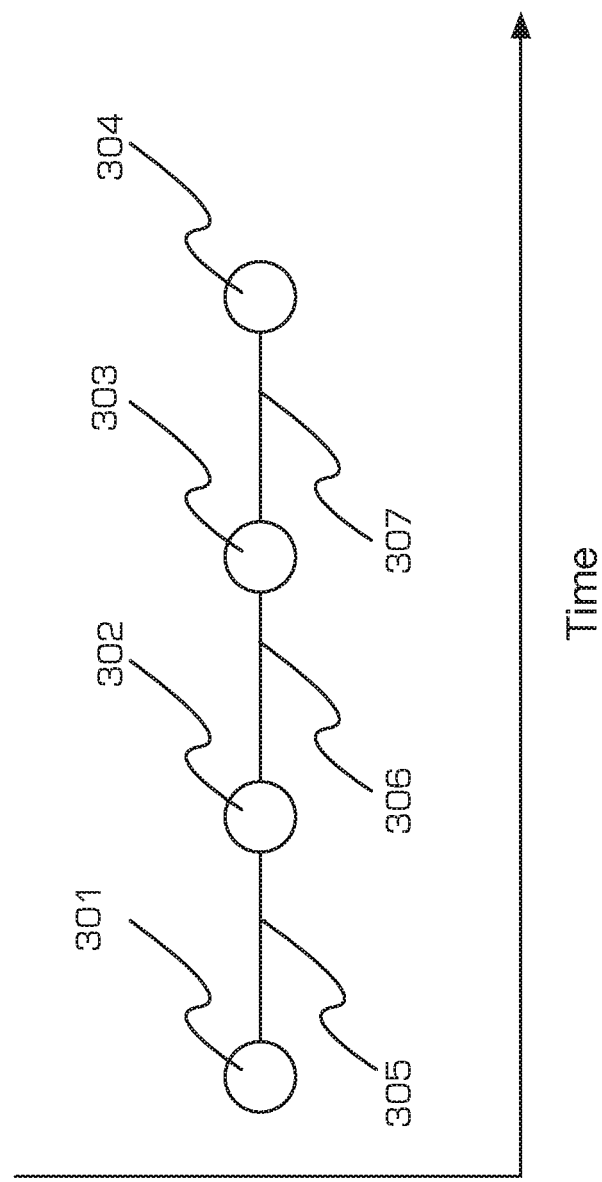

PATH-BASED PROGRAM LINEAGE INFERENCE ANALYSIS

RELATED APPLICATION INFORMATION

This application claims priority to U.S. Provisional Patent Application No. 62/544,138, filed on Aug. 11, 2017, incorporated herein by reference in its entirety.

BACKGROUND

Technical Field

The present invention relates to cybersecurity and more particularly to identifying hijacked or malicious software a computer systems.

Description of the Related Art

In the field of cybersecurity one of the significant concerns that enterprises are struggling to address is the identification of malicious software. Often the malicious software does not present itself as a stand-alone program, but rather is incorporated into legitimate commercial software. In this case the software is said to be a trojan or hijacked. Identifying these hijacked programs is difficult and consumes a significant portion of IT resources.

SUMMARY

According to an aspect of the present principles, a computer-implemented method is provided for securing an enterprise environment by detecting suspicious software. The computer-implemented method includes constructing a global program lineage graph. The global lineage graph includes a node created for each version of a program installed on a set of user machines. The node includes metadata associated with the respective version of the program. Each node is identified by a unique identifier. Additionally, the global lineage graph has at least two nodes linked with a directional edge. The directional edge represents a progression from a first version of the program to a next version of the program based on an event time of each version of the program. For each version of the program, a prevalence number of the set of user machines on which each version of the program had been installed is determined; and the prevalence number is recorded to the metadata associated with the respective node. Anomalous behavior, indicative of a suspicious software, is identified based on structures formed by the at least two nodes and associated directional edge in the global program lineage graph. An alarm is displayed on a graphical user interface for each suspicious software based on the identified anomalous behavior.

According to an aspect of the present principles, a supervisory machine is provided for securing an enterprise environment by detecting suspicious software. The supervisory machine is in electrical communication with one or more user machines. The supervisory machine includes a storage device configured to store program lineage data received from the one or more user machines, and a global program lineage graph. The supervisory machine also includes a processor operatively coupled to the storage device and configured to detecting suspicious software by executing program code, stored on the storage device. The processor, executing the program code, constructs the global program lineage graph. The global program lineage graph includes: a node for each version of a program installed on a set of user machines. The node includes metadata associated with the respective version of the program. Each node is identified by a unique identifier. Additionally, the global lineage graph includes a directional edge linking at least two nodes. The directional edge represents a progression from a first version of the program to a next version of the program based on an event time of each version of the program. For each version of the program, a prevalence number of the set of user machines on which each version of the program had been installed is determined; and the prevalence number is recorded to the metadata associated with the respective node. Anomalous behavior, indicative of a suspicious software, is identified based on structures formed by the at least two nodes and associated directional edge in the global program lineage graph.

The supervisory machine also includes a display screen that has a graphical user interface implemented by the processor and displayed on the display screen. The graphical user interface is configured to present an alarm for each suspicious software based on the identified anomalous behavior.

According to an aspect of the present principles, a computer program product including a non-transitory computer readable storage medium having program instructions embodied therewith is provided. The program instructions executable by a computer, causes the computer to perform a method for securing an enterprise environment by detecting suspicious software. The computer program product includes constructing a global program lineage graph. The global lineage graph includes a node created for each version of a program installed on a set of user machines. The node includes metadata associated with the respective version of the program. Each node is identified by a unique identifier. Additionally, the global lineage graph has at least two nodes linked with a directional edge. The directional edge represents a progression from a first version of the program to a next version of the program based on an event time of each version of the program. For each version of the program, a prevalence number of the set of user machines on which each version of the program had been installed is determined; and the prevalence number is recorded to the metadata associated with the respective node. Anomalous behavior, indicative of a suspicious software, is identified based on structures formed by the at least two nodes and associated directional edge in the global program lineage graph. An alarm is displayed on a graphical user interface for each suspicious software based on the identified anomalous behavior.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a representation of a program lineage graph, in accordance with an embodiment;

DETAILED DESCRIPTION OF PREFERRED EMBODIMENTS

In accordance with the present principles, systems and methods are provided for detecting suspicious software using a path-based program lineage inference analysis. The systems and methods include components embodied and executed by user machines, such as desktop computers, and components embodied and executed by a supervisory machine, such as a server.

In accordance with the present principles, the systems and methods include gathering program information relating to programs installed on user machines in an enterprise environment. The program information may be incorporated into a global lineage graph constructed for each program, including the program's various versions and updates. The structure of the global program lineage graph may be analyzed, as described below, to detect anomalous behaviors of the program versions and updates.

Additionally, a prevalence of each program version within the enterprise environment may be determined, as described below. The determined prevalence may reflect the global occurrence, herein referred to as global prevalence, of each program version or update across the user machines in the enterprise environment. The determined prevalence may reflect the number of user machines in the enterprise environment that have had the program version or update installed at least once, which is herein referred to as machine prevalence. In some embodiments both the global prevalence and the machine prevalence may be determined.

The present principles utilize the outcomes of the anomalous behavior detection and the prevalence determinations to identify suspicious software. Additional analyses, as described below, may be performed as well to further assist in identifying suspicious software.

Scores may be assigned to results of each analysis. These scores may be summed to generate a total score, which may be sorted in descending order. Any scores that fall below a suspicious program threshold may trigger an alarm. The scores may be assigned to each individual node or to all the nodes in a program line collectively. Moreover, a combination of individually assigned and collectively assigned scores may be used as appropriate based on the analysis the score references. Upon identifying a suspicious software based on the total score, an alarm may be issued and displayed in, for example a graphical user interface presented on a display screen.

The present principles identify suspicious and non-suspicious programs, thus allowing information technology (IT) administrators to focus limited resources on evaluating suspicious programs to determine whether the suspicious programs may be malicious or benign. By presenting the IT administrator with a subset of programs installed in an enterprise environment, malicious programs may be more quickly quarantined and removed, thus limiting the impact the malicious program may have on the enterprise systems.

Figure 1:
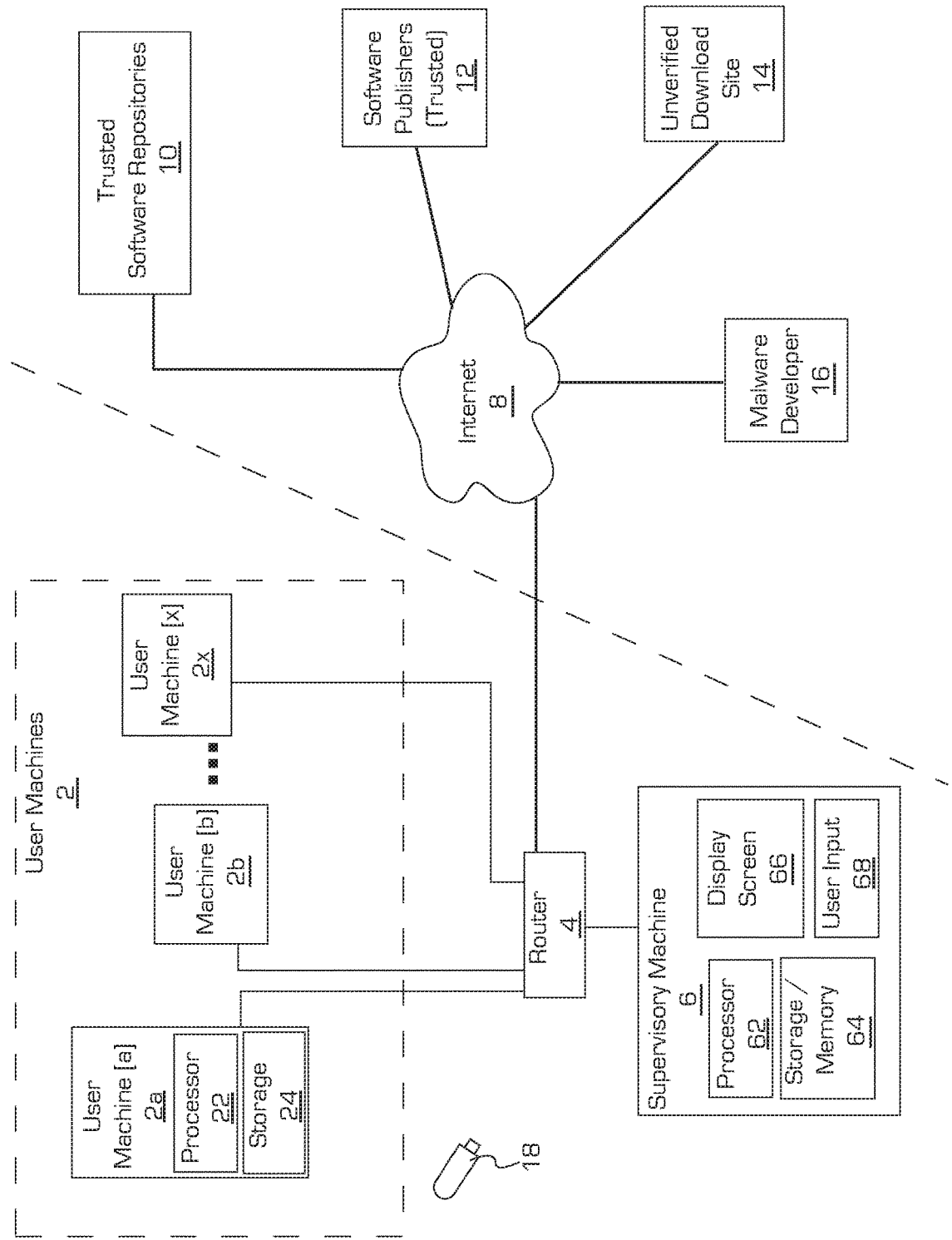
FIG. 1 is a block/flow diagram illustrating a high-level system/method for path-based program lineage inference analysis, in accordance with an embodiment.

Referring now in detail to the figures in which like numerals represent the same or similar elements, and initially to FIG. 1, an enterprise environment in accordance with the present principles is shown.

As shown in FIG. 1, an enterprise, such as a corporation, university, governmental agency, or any similar organization, may be configured with one or more user machines $2a$-$2x$ (collectively referred to as user machines 2). The user machines 2, may be any combination of desktop computer systems, laptop computers, tablet computers, mobile devices (e.g., smartphones), kiosks, networked printers, smart appliances, smart televisions, or any other networkable device that executes programs or firmware instructions. It is also noted that the user machines 2 are generally equipped with storage 24 configured to store a program, such as a hard drive, or solid-state memory, and a processor 22 configured to execute instructions and functions embodied in the program.

The user machines 2 are in communication with one another either directly, as in an ad-hoc peer-to-peer network, or indirectly through a server-client configuration. Any other appropriate networking schemes are also contemplated by the present principles. In the present embodiment, a router 4 implements the network backbone and provides access to the Internet 8.

In addition to the user machines 2, a supervisory machine 6 is coupled to the network by way of the router 4. The supervisory machine 6 may be a dedicated server, desktop computer, laptop, etc. having the requisite computing power and capabilities necessary to execute the supervisory functions in accordance with the present principles as described below. Alternatively, the supervisory machine 6 may be one of the user machines 2 tasked with the additional role of performing the supervisory functions.

The supervisory machine 6 is configured with a processor 62, storage/memory 64, a display screen 66 and user input devices 68, such as keyboard, mouse, touch component of the display screen 66 or any combination of these devices.

Software is often acquired, installed and upgraded by way of the Internet 8, or other network. For example, software may be downloaded from a trusted software repository 10. Such a software repository is considered trusted if it scans software uploaded thereon for malware and viruses at an acceptable level. Additionally, software publishers 12 are considered as another source of trusted software. It should be noted that not all software publishers 12 are equally trusted. Publishers of major commercial software packages may be considered highly trusted, while smaller or lesser known publishers may be regarded as less trusted.

Unverified download sites 14 are similar to the trusted software repositories 10, except that unverified download sites 14 do not perform malware and virus detection scans of the software being served or the scans performed may not reliably detect malware and viruses. Thus, software packages downloaded from unverified download sites 14 may be one of the entry points from which malicious programs can enter an enterprise environment.

Furthermore, software may be downloaded directly from a malware developer 16. This situation may occur when a malware developer 16 provides a website that appears to be a legitimate site. Alternatively, this situation may occur without a user's knowledge, as when a hijacked executable downloads additional malware in the background without notification being provided to the user.

Still another source of software in an enterprise environment is by way of removable media 18, for example flash drives connectable to the user machine's 2 Universal Serial Bus (USB). This software source may be considered as an unverified software source since the provenance of the software is unknown.

In accordance with the present principles, a user machine component configured to perform the user machine specific processes of the present principles may be implemented as an installable program, firmware instructions, hardware logic, or combination thereof. The processes performed by the user machine 2 and supervisory machine 6 will be described in detail below.

Figure 2A:
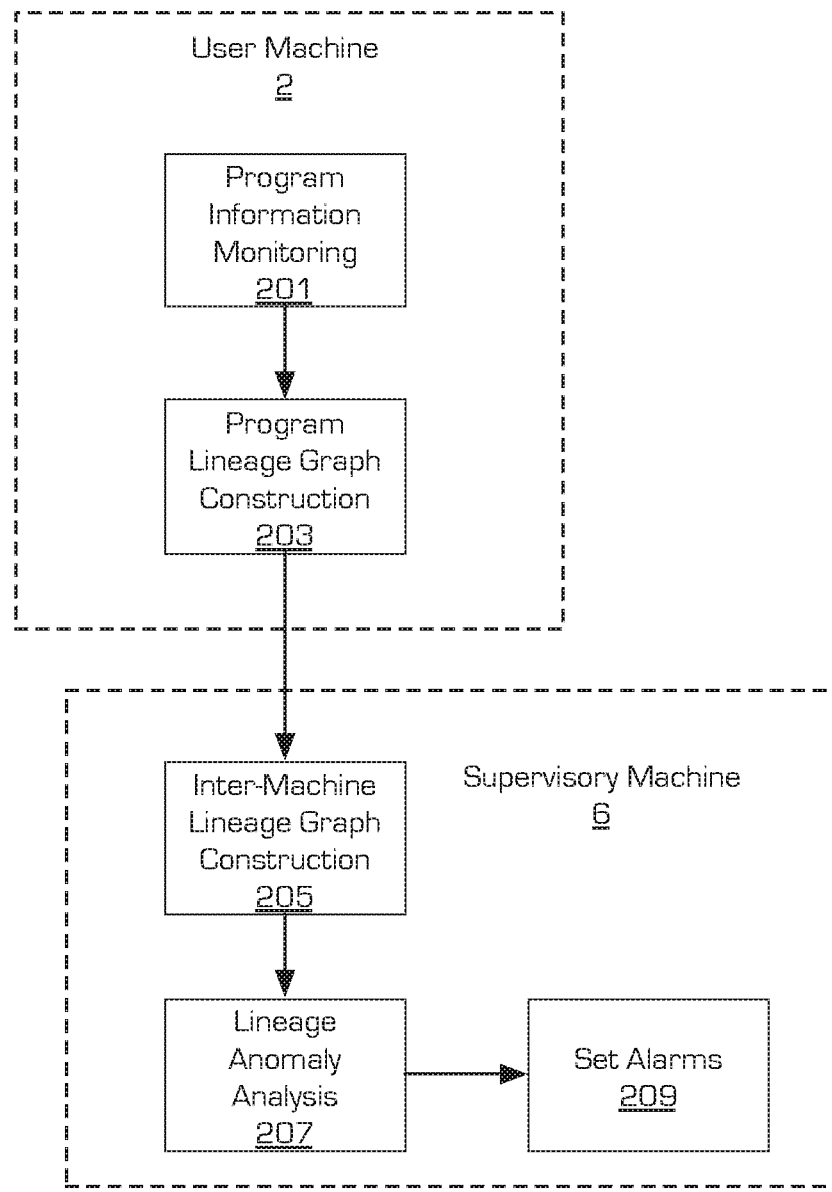
FIG. 2A is a flow diagram illustrating a high-level method for path-based program lineage inference analysis, in accordance with an embodiment.

In an embodiment shown in FIG. 2A, each user machine 2 on an enterprise network performs program information monitoring at block 201. As described above, the program information monitoring at block 201 tracks program installation and update events, and record program lineage data related thereto, such as, but not limited to: file path, program signature, and observation time, and metadata including installation source, signature verification and signature reputation.

The program signature may be a calculated alphanumeric checksum generated, based on contents of the program, by, e.g., a hash function. Consequently, the program signature is unique to a specific software and version. Other unique identifiers of a specific program version may be used in place of the hash function without departing from the present principles. Monitored events may include installation events and update events. Other events that are considered appropriate may be monitored as well without departing from the present principles.

Thus, in block 201 the program information gathered allows events to be tracked over time based on the install file paths of the programs. For example, a program may be initially installed at a first location; updates to the initial program are expected to be installed at the same location, as well. Thus, the systems and methods of the present principles can track and associate each install and update event with a particular program line. A program line, with respect to the present principles, refers to a parent program and all of the parent program's updates and versions.

When a particular program is updated, by way of an automated update process incorporated into the program or a separate installer/updater program, the new program, and any supporting files, is expected to be placed in the same file path as the original. While deviation from the previously used file path is not a definitive indicator of a hijacked program, such a situation, in combination with one or more other parameters being monitored, may result in the program being identified as suspicious and in need of further evaluation.

The observation time collected in block 201 identifies the causal relationship of related programs in a program line, representing which program is an initial (e.g., original installation) state and which program is an updated state. Each program version may be identified by its unique program signature.

With respect to present principles, the program signature may be a checksum calculated by the user machine 2 after installation or update of a program. With respect to present principles, the term checksum, as used herein, refers to any functions that produce unique finite length alphanumeric strings calculated based on the contents of a program. The checksum may be calculated, at block 201, using algorithms such as MD5 (message digest 5), SHA (secure hash algorithm), CRC32 (32-bit cyclic redundancy check), or any other function as known in the art. Each user machine 2 may use the same algorithm when calculating the signature so that identical program versions on different user machines 2 will have identical signatures.

In one embodiment, a function used for program verification may be employed, at block 201, so that the signature calculated by the user machine 2 may be verified with the publisher of the program or other software verification database.

Upon completion of the program information monitoring in block 201, the user machine 2 constructs a program lineage graph in block 203. The program lineage graph (an example of a program lineage graph is shown in FIG. 3) is created with each program signature of programs sharing the same file path represented by a node. Additional, program lineage data can be stored as metadata associated with the respective node in block 203. Alternatively, rather than constructing a program lineage graph in block 203, an embodiment of the present principles creates an entry in a program lineage database where the program lineage data is held in appropriate fields of the database.

A program lineage graph is created separately, in block 203, for each monitored program in the user machine 2. All the program lineage graphs on an individual user machine 2 are collectively referred to as a set of program lineage graphs.

In most enterprise configurations, multiple user machines 2 of various types are present on the enterprise network and in electronic communication with one another, whether directly, as for example an ad-hoc or peer-to-peer network, or through an intermediate machine, such as a data server. Therefore, in a multiple user machine 2 environment, the present principles include constructing multiple sets of program lineage graphs, one set by each user machine 2, as described above.

A supervisory machine 6 collects program information from the user machines 2, and creates the set of program lineage graphs, from the monitored user machines 2 on the enterprise network. The individual program lineage graphs from the monitored user machines 2 are merged based on matched program signatures of the monitored programs to form a global lineage graph, or inter-machine lineage graph, for each monitored program in block 205, such that program lineage data representing a given program from one user machine 2 is grouped with the program lineage data of the same program received from other user machines 2.

Specifically, each global lineage graph constructed in block 205 includes nodes having the signature of an initially installed program and nodes having signatures of each associated update program regardless of the install path of the program on the individual user machines 2. In this way, differences in install path for a given program from one user machine 2 to another does not affect the merging of nodes.

The global lineage graph constructed in block 205 includes additional information in nodes and edges. During construction of the global lineage graph in block 205, a node counter for each node is incremented when a program with a particular signature from one user machine 2 is merged with a program having the same signature from a different user machine 2. Each directional edge (also referred to herein as "edge") has a counter, as well, that is incremented, in block 205, when a directional edge between two nodes from one user machine 2 corresponding to a directional edge between the same nodes from a different user machine 2 is merged into the global lineage graph. Thus, the counters in the nodes and edges represent the prevalence of a particular program identified by a particular signature and a transition between program versions across the monitored user machines 2.

In the global lineage graph constructed in block 205, related nodes, e.g., nodes that are in the same program line, are linked by a directional edge in accordance with the observation times stored as metadata in the program lineage data. Repeated program signatures cause a node counter associated with the node for that signature to be incremented, in block 205, by each repetition. Similarly, in block 205 each repetition of a directional edge between two nodes also causes an edge counter associated with that directional edge to increment. Thus, the global program lineage graph constructed in block 205 has one node for each program signature and one edge between any two nodes in a given direction.

Figure 2B:
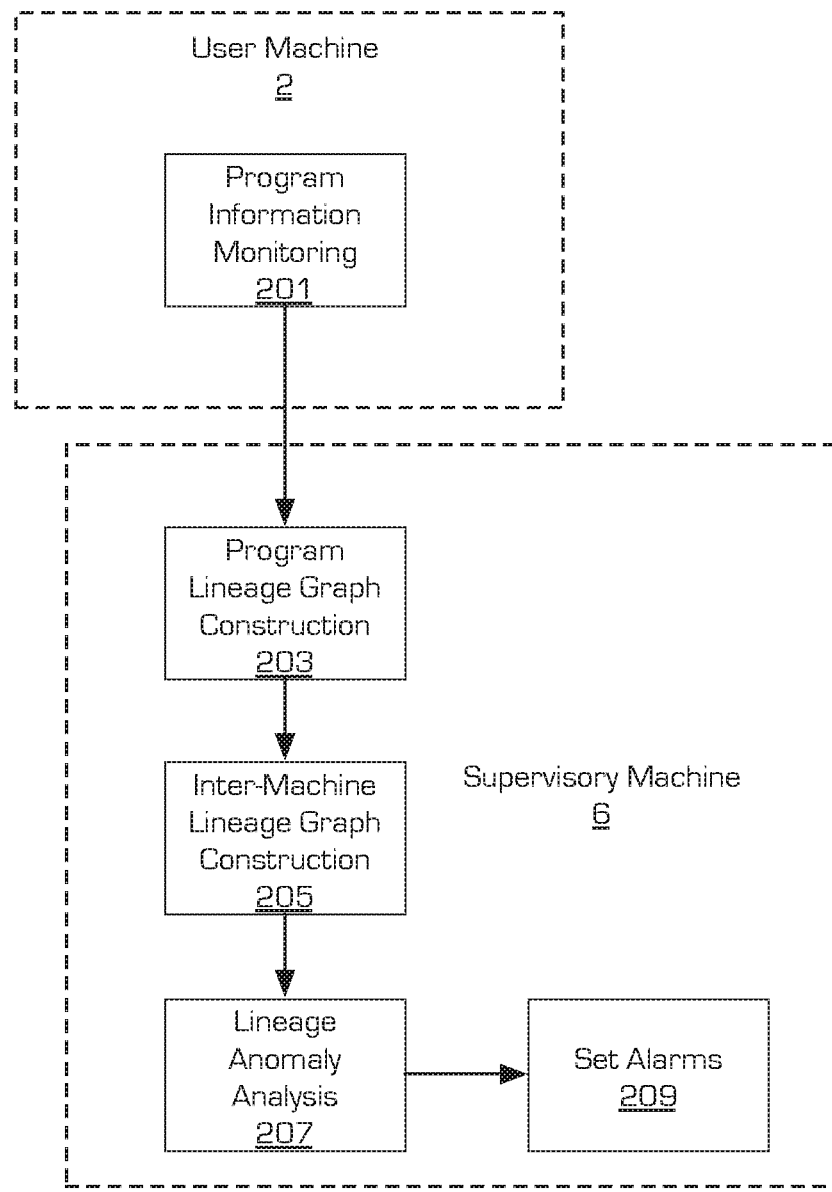
FIG. 2B is a flow diagram illustrating a high-level method for path-based program lineage inference analysis, in accordance with an embodiment.

In an embodiment shown in FIG. 2B, the user machine 2 does not construct program lineage graphs. Instead block 203 is located at the supervisory machine 6. In this case, the user machine 2 transfers the collected program information from block 201 to the supervisory machine 6. The supervisory machine 6 may construct a program lineage graph in block 203. Alternatively, the supervisory machine 6 may forego block 203, and instead process the program information received from all the user machines 2 directly to construct the inter-machine lineage graph at block 205. Furthermore, some embodiments may have a supervisory machine 6 configured to examine user machines 2 and directly collect program information. In this way, program information from a compromised user machine 2 is less likely to be compromised.

Once the global lineage graph is constructed in block 205, lineage anomaly analyses are performed in block 207 to identify programs showing anomalous or suspicious behavior. Representative lineage anomaly analyses of the present principles are discussed in detail below. However, the analyses described herein should not be considered limiting, but rather are provide as examples, and thus additional analyses may be performed as deemed appropriate without departing from the present principles.

Once suspicious programs have been identified in block 207, the present embodiment may issue alarms for the suspicious programs in block 209. The alarms may, for example, take the form of on-screen notifications, emails sent to one or more IT administrators tasked with cybersecurity of the enterprise environment, an audio signal, or a combination thereof.

The program lineage graph, in FIG. 3, shows an initially installed program as an initial node 301 followed by additional nodes 302, 303 and 304 representing updates of the initially installed node 301. The initial node 301 is connected to the update node 302 by an edge 305. Thus, the edge 305 represents a transition from one signature to another, for example, from an initial installed program 301 to an updated program 302, or a first update 302 to a subsequent update 303 via edge 306, with respect to the recorded observation time. As shown in FIG. 3, the edges 305, 306 and 307 are directional in that the edges 305, 306 and 307 indicate the direction of the events. In the case of the graph shown in FIG. 3 the direction of each of the edges 305, 306 and 307 is linear from an initial install 301 through progressively more recent updates 302, 303 and 304. Consequently, the program lineage graph represents a progression of a program in a particular file path from initial install to current update state.

Initially, the graph structure is analyzed, as described above with respect to block 207 of FIG. 2A, to determine whether the global lineage graph is a solo (an island node), a path (a list of nodes connected like a line), a tree (a graph of a tree shape), or a cycled graph (a graph with edges which return to parent nodes causing cycles). Graphs with cycles get low scores indicative of the corresponding program, also referred to herein as an executable, being a candidate for concern.

A solo graph, having an island node, is indicative of a program that is newly installed and has not had any updates since installation. In this case little is indicated by the graph itself. Instead, evaluation of the program may be based on the other analyses performed in accordance with the present principles, as described below.

A path graph is indicative of an expected executable life cycle, where an executable is initially installed followed by expected updates to the program over time. Thus, the path graph indicates the least concern of all the graph types and thus would receive the highest score. FIG. 3 illustrates a path graph.

Regarding scoring the graph structures, highest score, lowest score, etc. as used herein are intended to be illustrative and not at all limiting. The scoring terms and examples are to be understood as showing a relationship between results indicative of low risk and results indicative of high risk of a software being malicious. The actual values assigned during implementation of the present principles are dependent on the range of values, or level of granularity, provided. Thus, an embodiment may use very coarse granularity by assigning one of two values (e.g., 0 or 1) for example.

Other embodiments may implement a finer granularity such that for example 10 values are available. Thus, a low score may be any value below a particular threshold value that is either preset or adjusted by a user of the present principles. A mid-range score may be similarly determined by another threshold value, such that values falling between the two thresholds may be considered a middle score. Scores surpassing both thresholds may be considered a high score. Moreover, each scoring category may not be of equal size. For example, more values may be provided below a low score threshold than available at either the mid-range or high score categories, (e.g., thresholds may be set at 5 and 8 out of a range of 10).

A cycle graph is indicative of a program that has been installed, updated at some point and then reverted to the previous version. Such a situation can innocently occur when the updated program is found to cause problems such as not supporting legacy hardware or document formats, for example, and so the user has reverted (or downgraded) to the previous version. On the other hand, such a situation can also indicate a hijacked or malicious program that has caused a downgrade to a previous program version that may have a known security vulnerability that a hacker could exploit.

The cycle graph receives the lowest score, because even in the innocent case the downgrade can reintroduce exploitable security vulnerabilities that were believed to be fixed. In this case, even if the downgrade occurred without malicious intent the cyber security department may need to compare the risk introduced against the user's reason for downgrading and determine whether to allow the downgrade.

The tree graph may occur in enterprises having many user machines 2. The tree graph is indicative of multiple situations. Portions of the graph may have linear path segments, such as in the path graph described above. Other portions may have cycles. Still other portions may indicate that particular user machines 2 may have missed an update to the program, but then jumped to a more recent update. The score for this type of graph is dependent on the particular details represented therein.

Figure 4:
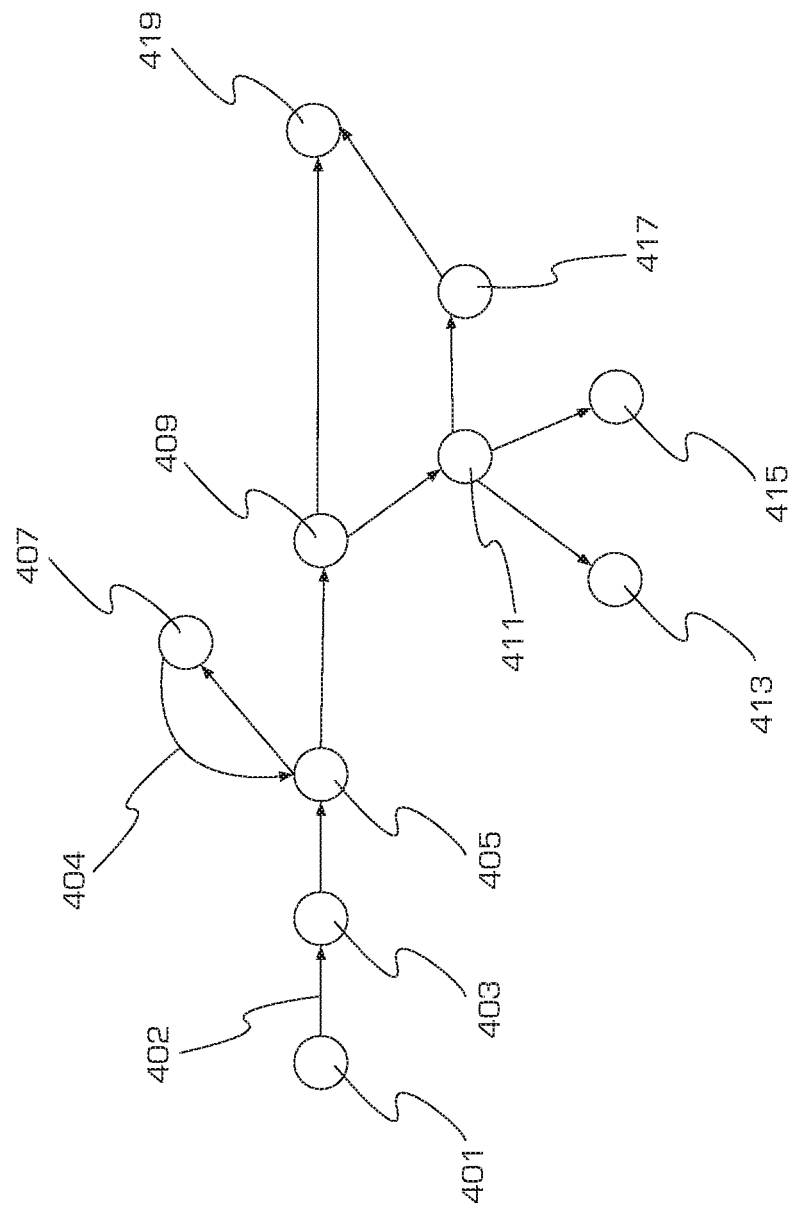
FIG. 4 is a representation of another program lineage graph, in accordance with an embodiment.

An example of a tree graph is shown in FIG. 4. Node 401 is the initial program installation event. Followed by a linear progression to node 403 as indicated by edge 402, and then onto node 405. At node 405, however, a branching occurs, where some user machines 2 upgrade to the program version represented by 407 while others upgrade to the program version represented by 409.

There are several scenarios that could cause the graph structure represented by nodes 405, 407 and 409. For example, one such scenario may occur when node 407 represents a program version that is found to have bugs. Thus, the early adaptors in the enterprise upgrade from node 405 to node 407. Once upgraded to node 407, the user machines 2 may experience crashes or other problems, or perhaps a security vulnerability is identified. As a result, the user machines 2 with node 407 installed cycle back, as indicated by edge 404 (note the direction of the arrow representing edge 404) to node 405. The later adaptors, having heard of the issues with the program version represented by node 407, simply wait for the next stable update represented by node 409. At which point, all the user machines 2 update from node 405 to node 409.

Alternatively, node 407 may represent a hijacked version of the update represented by node 409. Thus, a subset of user machines 2 may have installed the hijacked version represented by node 407, which covertly downgrades the user machines 2 back to node 405. The purpose of the downgrade to node 405 may be to allow hackers to exploit a known vulnerability in the program version represented by node 405 that the update to node 409 might have closed.

At node 409, another more complex branching occurs, where some user machines 2 proceed to node 411 while others proceed directly to node 419. An example of a scenario that would lead to one or more user machines 2 updating from node 409 to node 411 and then to node 417 and finally to node 419 may be that nodes 411 and 417 are beta versions of a program. Thus, early adaptors at an enterprise may update along a beta program track, which progresses from node 411 to node 417 and finally ends with a final official update release represented by node 419.

Nodes 413 and 415, however, could be a signal to administrators that malware may be present. Beta software is prone to security vulnerabilities, which are usually identified during the testing process and addressed before reaching the official release version of the update. However, during testing, malware can be introduced through these security vulnerabilities. An explanation for node 413 and node 415 on a subset of user machines 2 may be that a vulnerability is found in node 411 and exploited to install hijacked program versions represented by node 413 and node 415.

As noted above, the nodes and edges of the global lineage graph include node counters and edge counters that track the number of user machines 2, which have installed the program version associated with a node and the number of user machines 2 that performed an event associated with an edge. An analysis in accordance with the present principles converts node counters and edge counters into global prevalence percentages that are relative ratios to the total number of counts in the global lineage graph. The percentages indicate a global prevalence of a node or edge across all instances.

The global prevalence tracks the total number of instances of each program version (e.g., node) and each instance of an event path (e.g., edge). Thus, if a user machine 2 has multiple instances of a program version installed, each instance may be counted separately and factored into the calculated percentages.

The nodes and edges are sorted with respect to the global prevalence percentages. The nodes and edges with low global prevalence percentages may have a higher chance of being selected as candidates for alarm. A low global prevalence percentage would indicate that the particular program version has been rarely installed, which may indicate a hijacked program, malicious program, or security vulnerability. Each node or edge may be assigned a weighted score calculated based on the respective calculated global prevalence percentages.

Additionally, a machine prevalence score may be determined. In this metric, the duplicate nodes and edges within the same user machine 2 are not counted, thus measuring the contribution from different user machines 2 only. Consequently, even if a user machine 2 has multiple instances of the same program version installed thereon, the count will only be incremented by 1 signifying that the program version has appeared at least once on the user machine 2.

The nodes and edges may be sorted with respect to the machine prevalence percentages. The nodes and edges with low machine prevalence percentages may have a higher chance of be selected as candidates for alarm. The low machine prevalence percentages may indicate that the programs associated with those nodes were installed on a small number of user machines 2, which may be an indication of a hijacked program, malware or security vulnerability. Each node or edge may be assigned a score calculated based on the respective calculated machine prevalence percentages.

In an embodiment of the present principles, each node, and each edge, has a global counter and a machine counter in order to facilitate calculating global prevalence and machine prevalence respectively.

Figure 5:
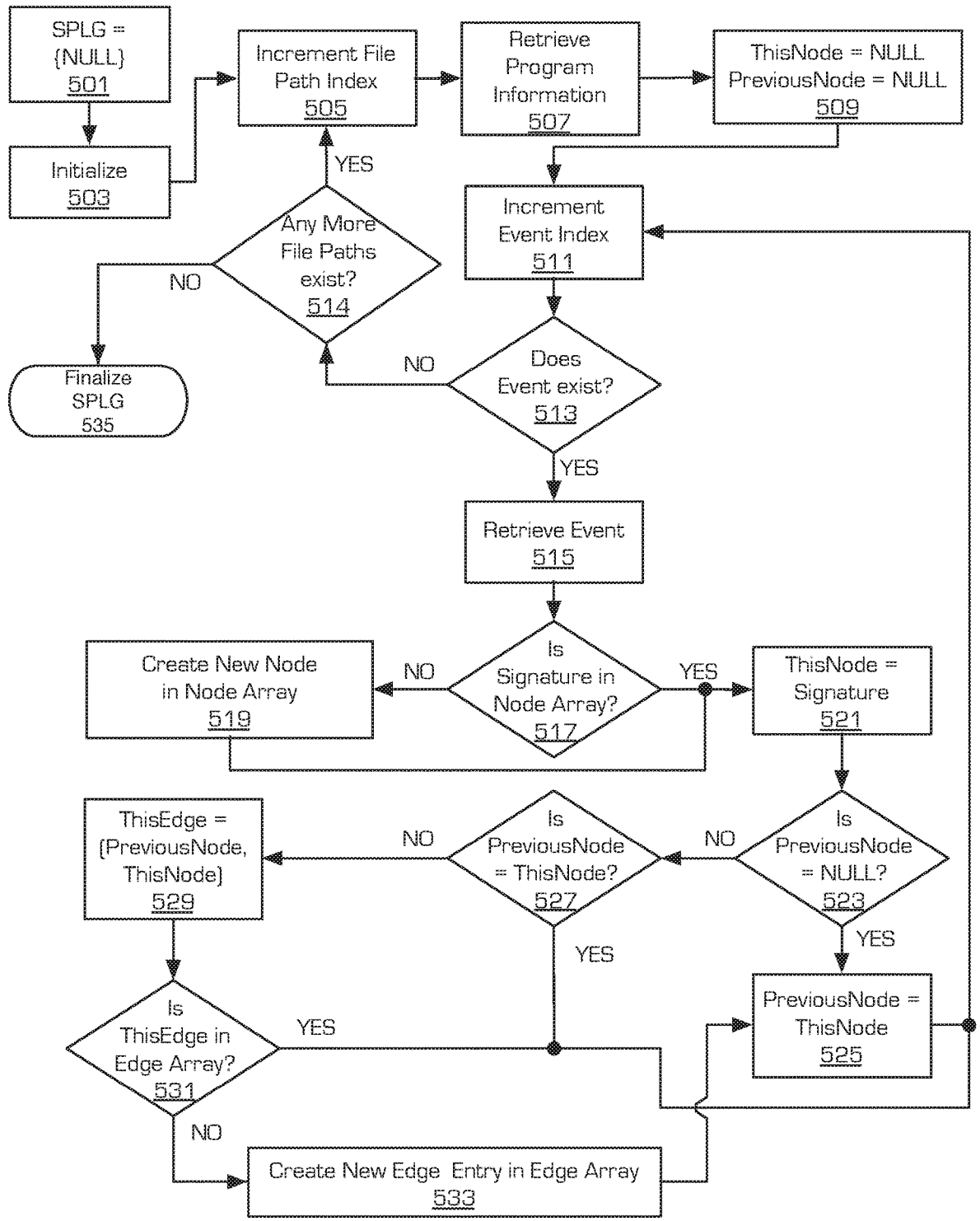
FIG. 5 is a flow diagram illustrating a method implementing an embodiment of the program information monitoring and program lineage graph construction in accordance with an embodiment.
Figure 6:
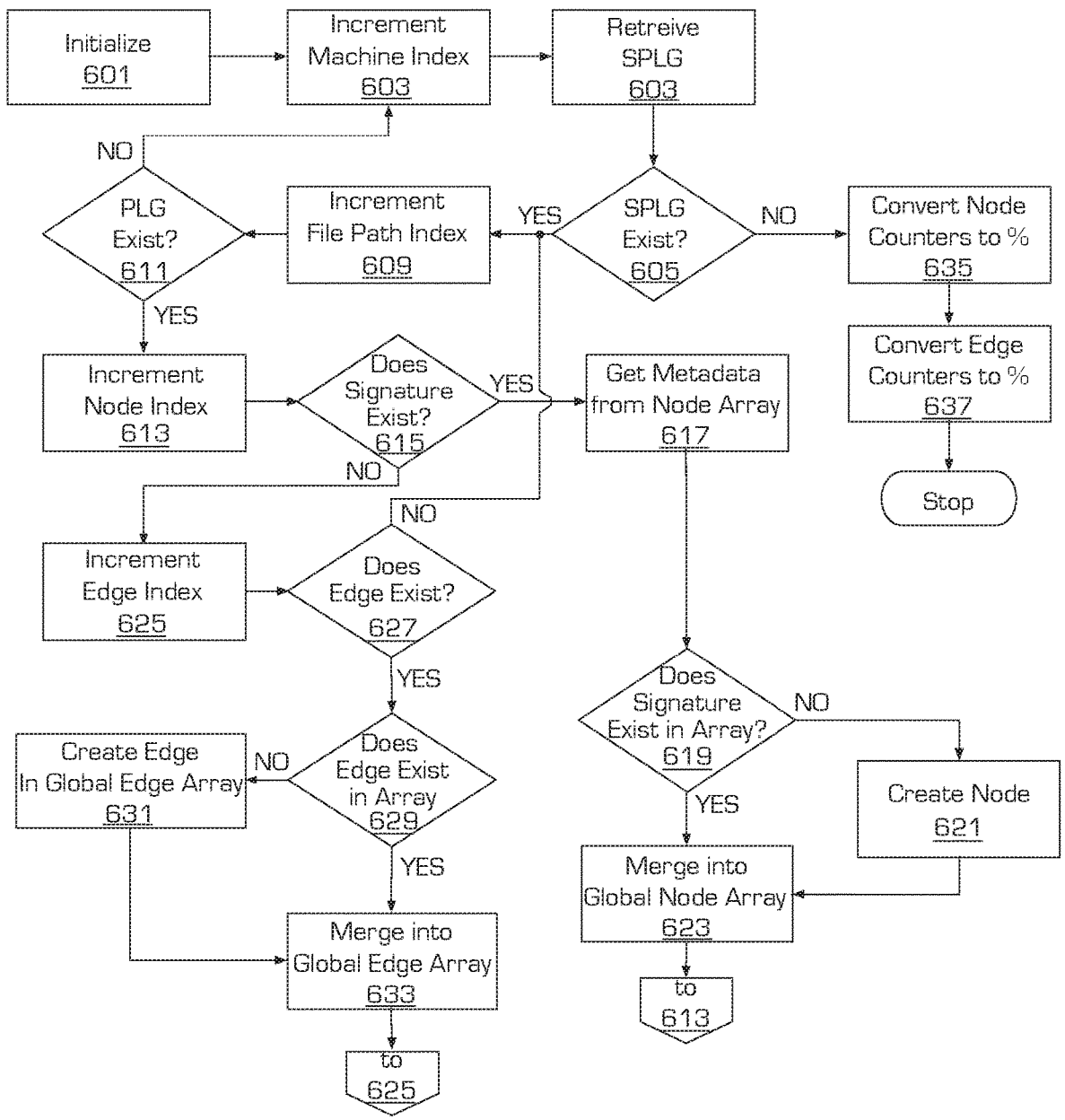
FIG. 6 is a flow diagram illustrating a method implementing an embodiment of the global lineage graph construction in accordance with an embodiment.
Figure 7:
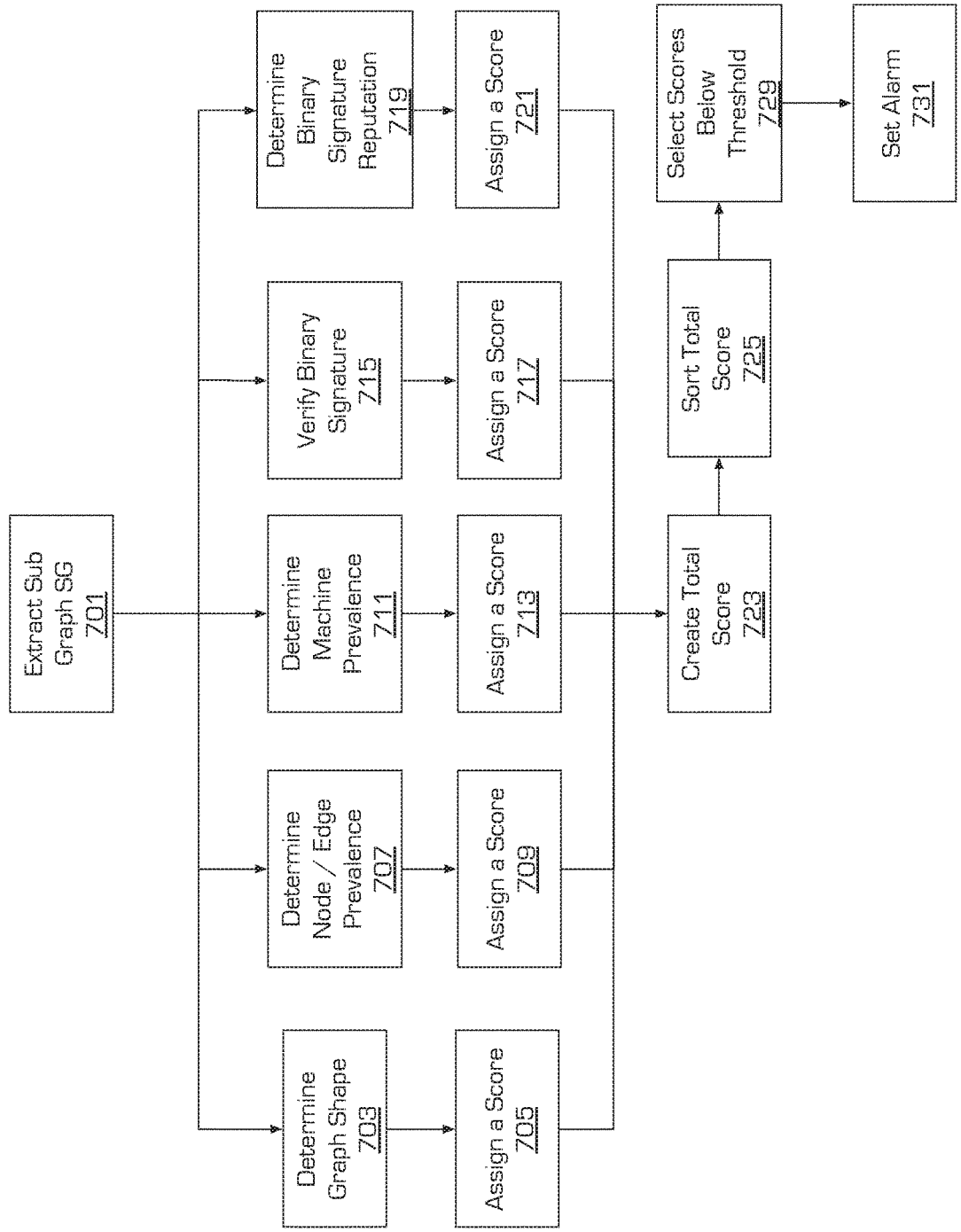
FIG. 7 is a flow diagram illustrating a method implementing an embodiment of the lineage anomaly detection in accordance with an embodiment.

With reference to FIGS. 5-7, an embodiment of the present principles will be described below.

As broadly described above, an embodiment of the present principles includes each user machine 2 in an enterprise gathering program information relating to respective programs being monitored. The program information may be stored in a database indexed by the file path of each monitored program. The database includes all recorded events for a given file path. Thus, the information is defined as a time series of a file path. Each event entry includes: an observation time, a program signature, verification result of the program signature, and reputation of the signature.

Referring now to FIG. 5, a process for generating a set of program lineage graphs (SPLG) by a user machine 2 or supervisory machine 6 is illustratively depicted in accordance with an embodiment of the present principles. The SPLG is a collection or array of program lineage graphs corresponding to all the programs being monitored on an individual user machine 2.

The process begins with an empty SPLG array at block 501. The process initializes all the indexes, such as a file path index and an event index, at block 503. The file path index is a counter for referencing individual program information related to the program installed at the indexed file path. The event index is a counter for referencing individual events contained within the program information. The file path index is incremented by 1 at block 505. The process retrieves program information at block 507. Also, the variables ThisNode and PreviousNode are cleared in block 509. The event index is incremented by 1 in block 511. The variable ThisNode is configured to hold a reference to a present node being evaluated, while the variable PreviousNode is configured to hold a reference to the immediately previous node evaluated.

The process proceeds to block 513 where a check is performed to determine if an entry exists for an event at the current event index in the program information of the current file path index. A "NO" response to the check at block 513 indicates that all the events for the current file path index have been processed. Thus, the process finalizes the current program lineage graph, adding the graph to the SPLG before proceeding to block 514. At block 514, the process checks if any unprocessed file paths exist. If no more file paths exist, the process finalizes the SPLG and terminates at block 535. Alternatively, if the check at block 514 determines that an unprocessed file path exists, the process continues to the next file path by incrementing the file path index by 1 at block 505. The process then continues to block 507 as described previously.

However, if an entry exists for the event (e.g., a "YES" response at block 513), the process retrieves the data for the event from the program information at block 515. A check is performed in block 517 to determine if the signature for the program associated with the event exists in a node array for the current file path. If the program signature does not exist in the node array, then a new node is created indexed by the program signature in block 519. The new node includes: a verification result of the program signature, a reputation of the signature, and an observation time as metadata.

The user machine 2 may retrieve a verification result from a local or remote signature repository and assign a score for the reputation of the signature. Alternatively, the fields for the verification result and the reputation of the signature may be left blank, to be filled by the supervisory machine 6 during the lineage anomaly detection process described in greater detail below with reference to FIG. 7. Once the new node is created and added to the node array, at block 519, the program lineage graph is updated with the revised node array. The updated program lineage graph is then added to the set of program lineage graphs for the user machine 2.

After creation of the new node at block 519, the process proceeds to block 521. Alternatively, if the check at block 517 determines that the program signature exists in the node array the process proceeds directly to block 521 from block 517 without performing the actions in block 519. Continuing at block 521, the process sets the variable ThisNode equal to the program signature. The process then checks if the variable PreviousNode is empty in block 523. If PreviousNode is empty then the process sets PreviousNode equal to ThisNode in block 525, the process returns to block 511 where the event index is incremented, and the process continues as described above.

If the PreviousNode is not empty in block 523, a second check is performed to determine if PreviousNode is equal to ThisNode in block 527. If PreviousNode is equal to ThisNode, the process returns to block 511 where the event index is incremented, and the process continues as described above. However, if PreviousNode is not equal to ThisNode in block 527, the process sets the variable ThisEdge equal to [PreviousNode, ThisNode] in block 529. The variable ThisEdge is configured to hold a reference to two linked nodes (PreviousNode, ThisNode). The process checks if ThisEdge already exists in an array of edges in block 531. If ThisEdge exists in the array of edges, the process returns to block 511 where the event index is incremented, and the process continues as described above.

On the other hand, if the check in block 531 determines that ThisEdge is not present in the edge array, the process generates a new edge entry that connects the node relating to PreviousNode to the node relating to ThisNode in block 533. The new edge entry is added to the edge array, at block 533, and the program lineage graph is updated with the revised edge array. The updated program lineage graph is then added to the set of program lineage graphs for the user machine 2. The process proceeds to block 525, where PreviousNode is set equal to ThisNode, and then onto block 511, where the event index is incremented and continues as described above.

The SPLG creation process, shown in FIG. 5, continues until all program information for all the file paths have been processed.

As described above, once the individual user machines 2 have created a set of Program Lineage Graphs, the SPLG are sent to the supervisory machine 6 for analysis. The supervisory machine 6 begins the analysis by creating a Global Lineage Graph that merges all the SPLG received from the user machines 2.

Referring to FIG. 6, construction of the global lineage graph (GLG) will be described. The supervisory machine 6 begins construction of the GLG at 601 by initializing all the indexes and variables used in the process. After initialization, a machine index is incremented at 603. The machine index is used to retrieve the SPLG of a user machine 2 corresponding to the machine index at block 603. A check is performed at block 605 to determine whether the SPLG for the current user machine 2 exists. If the SPLG does not exist, such that the GLG process has completed processing all the SPLG from all the user machines 2, the process proceeds to block 635. At block 635 the process converts node counters to percentages and proceeds to block 637 where the process also converts edge counters to percentages. The process then ends.

However, if the SPLG exists for the current user machine 2, the process continues to block 609 where a file path index is incremented. A check is performed to determine whether a program lineage graph exists for the current file path index at block 611. If the program lineage graph does not exist, then the process moves to block 603 to increment the machine index and proceed with a new SPLG from new user machine 2. On the other hand, if the program lineage graph exists, the process increments the node index at block 613 and the edge index at block 625. The execution of a node sub process (blocks 615 through 623) and edge sub process (blocks 627 through 633) may overlap somewhat or be executed in series. However, the edge sub process (blocks 627 through 633) are dependent on the nodes being created in the global lineage graph (GLG) by the node sub process (blocks 615 through 623), thus the two sub processes cannot be executed entirely in parallel with one another. Consequently, the GLG creation process will be described as a serial progression from node sub process (blocks 615 through 623) to edge sub process (blocks 627 through 633).

Once the node index has been incremented at block 613, the process checks whether a program signature exists in a node array of the program lineage graph currently being processed at block 615. If the program signature does not exist, the process continues to block 625 to process edges, as described below. If program signature exists in the node array at block 615, the process retrieves the metadata relating to the program signature from the node array at block 617. A check is performed at block 619 to determine whether the program signature exists in a global lineage node array. If the program signature does not exist in the global lineage node array, the process creates the node at block 621. If the program signature does exist in the global lineage node array or after creation of the node in block 621, the process merges the metadata from node array of the current program lineage graph into the global node array in block 623.

Merging the metadata includes incrementing a node counter that tracks the number of user machines 2 that have the node in their set of program lineage graphs (SPLG). The process then returns to block 613 to increment the node index and continue the processing of the remaining nodes in the node array as described above.

Once all the nodes have been processed in the program lineage graph, the process begins the edge sub process (blocks 627 through 633) by checking if the edge index exists in an edge array of the current program lineage graph at block 627. If the edge does not exist, the process increments the file path index at block 609 and continues to block 611 as described above.

Otherwise, the process checks if an instance of the edge exists in the global lineage edge array at block 629. If the edge does not exist in the global lineage edge array, the process creates the edge at block 631. If the edge does exist in the global lineage edge array or after creation of the edge in block 631, the process merges the edge from the edge array of the current program lineage graph into the global edge array at block 633.

Merging the edge includes incrementing an edge counter that tracks the number of user machines 2 that have the edge in their set of program lineage graphs (SPLG). The process then returns to block 625 to increment the edge index and continue the processing of the remaining edges in the edge array of the current program lineage graph as described above.

The global lineage graph (GLG) creation process continues until all of the SPLG from all the user machines 2 have been processed; at which point the check at block 605 will determine that no more SPLG remain and proceed to block 635 as described above. The GLG, once created will include a program signature, one or more observation times, a file path, verification status, and program reputation for each node. In addition, each node will have a node counter incremented each time another instance of the node, based on the program signature, is processed. Thus, the node counter will be able to show a prevalence of appearance for each executable. Similarly, each edge also includes an edge counter, which indicates the prevalence of different upgrade paths from one node to another. Taken together, the node counters and edge counters can indicate nodes and upgrade routes that are not typical. Such atypical nodes and edges may be indicative of malicious software.

Once the global lineage graph is constructed, the process performs a lineage anomaly detection process. An embodiment of the lineage anomaly detection process, shown in FIG. 7 in accordance with the present principles, begins by extracting sub-graphs (SG) for related nodes and edges from the global lineage graph, in block 701. The nodes and edges of the sub-graph (SG) are a collection of nodes and edges that represent a program and all of its various updates collected from all the user machines 2. The following analysis is performed on all the sub-graphs extracted from the global lineage graph.

The anomaly analysis described herein can be performed in parallel or in series as appropriate. At block 703, the graph structures are extracted and analyzed whether it is a solo (an island node), a path (a list of nodes connected like a line), a tree (a graph of a tree shape), and a cycled graph (a graph with edges which causes cycles). As discussed previously, tree structures may include path segments as well as cycles. Cycles are given the lowest score at block 705, while other structures are assigned scores based on the structures. The score assigned at block 705 has a weighting based on the importance of graph structure in determining an anomaly with respect to the other analyses performed. The weighting may be fixed or may be adjustable by an administrator to reflect individual circumstances.

Similarly, the process determines node and edge prevalence within the sub-graph in block 707. Nodes and edges that have a low prevalence of appearing in the sub-graph will receive the lowest score at block 709. Graph prevalence score analysis determines the prevalence of nodes and edges across all instances and gives low scores for the rare nodes and edges.

As with the structure score, the graph prevalence score is weighted as well, based on the importance of graph prevalence in determining an anomaly with respect to the other analyses performed. The weighting may be fixed or may be adjustable by an administrator to reflect individual circumstances.

Also, the process determines machine prevalence within the sub-graph in block 711. Nodes and edges that have a low prevalence of appearing across all the user machines 2 in the sub-graph will receive the lowest score at block 713. Machine prevalence score analysis determines the prevalence of nodes and edges across different machines without duplication of instances within a machine. Therefore, it captures the prevalence of nodes and edges across machines.

The machine prevalence score is weighted based on the importance of machine prevalence in determining an anomaly with respect to the other analyses performed. The weighting may be fixed or may be adjustable by an administrator to reflect individual circumstances.

Additionally, a verification status of program signatures is established, at block 715, and a verification score is assigned to the nodes, at block 717, based on the verification status. The verification status may be determined, at block 715, by referencing third-party databases, for example. If a program signature is not verified or blacklisted, a low score may be assigned to the node at block 717. If a program signature is verified, the node may receive a high score at block 717. The present principles contemplate that the verification status score assigns blacklisted programs a zero score while verified programs receive a score based on the reputation of the verifying authority. Non-blacklisted, non-verified programs may receive a low score but higher than the blacklisted programs at block 717.

The verification score assigned in block 717 may be weighted based on the importance of program signature verification in determining an anomaly with respect to the other analyses performed. The weighting may be fixed or may be adjustable by an administrator to reflect individual circumstances.

The lineage anomaly detection process determines the reputation of the program signatures of all the nodes in the sub-graph at block 719. The reputation score analysis determines what reputation each signature has. If a program signature has a bad reputation such as malicious software, it gets the lowest score at block 721.

If the program is a known malware or blacklisted, a lowest score may be assigned in block 721. If the program is not well known, a middle score may be assigned in block 721. Programs that are not well known may be programs developed by small publishers, or for a niche market. If the program is whitelisted or developed by respected publishers, a high score maybe assigned in block 721.

The reputation score assigned in block 721 may reflect a degree of risk associated with security vulnerabilities, malware, or how often software from a particular publisher is a victim of hijacking. Thus, even if a publisher is very well known, it may be targeted more often by hackers. Consequently, software originating from that publisher may get a lower score than a publisher that has had limited issues of hijacking, security vulnerabilities or malware.

The reputation score may be weighted based on the importance of program signature reputation in determining an anomaly with respect to the other analyses performed. The weighting may be fixed or may be adjustable by an administrator to reflect individual circumstances.

Once all the analyses are completed, the process sums all the weighted scores to obtain a total score for each node in block 723. The process sorts the total scores in ascending order at block 725. Once sorted, the process selects all nodes with scores below an alarm threshold at block 729. The total score of the program is compared to a threshold value, at block 729, such that programs with total scores that do not exceed the threshold value are flagged as alarms for further scrutiny, placed on a watchlist quarantined or removed. An alarm is set for these low scoring nodes in block 731 and notification provided to cyber security personnel for further handling.

In response to the alarm flag set in block 731, an embodiment of the present principles issues an on-screen notification displayed in a graphical user interface on the IT administrator's computer. Alternatively, an email may be sent to an IT administrator account. Moreover, alarms may be logged into an anomaly tracking database. The anomaly tracking database may be used, subsequently, in future program monitoring by the present principles.

While the present principles are described above as including a global program lineage graph, it is understood to one of ordinary skill in the art that the information represented within the global program lineage graph may be represented in alternative ways. For example, the information may be held in a database configured with the appropriate fields and structure. Such a database is fully capable of representing the interrelationship of nodes necessary for the automated analyses to be performed in accordance with the present principles. However, the graphical nature of the global program lineage graph allows for an IT administrator to easily visualize the data and identify programs that may require further inspection even before considering the analyses.

In an embodiment, the scores may include a weighting factor. The weightings applied to the score of each analysis, at blocks 705, 709, 713, 717 and 721, may be multiplicative factors between 0 and 1, for example, and indicative of the reliability of the analysis in detecting a suspicious program. Thus, each analysis score, at blocks 705, 709, 713, 717 and 721, may be multiplied by its respective weighting value. In other embodiments, alternative methods of adjusting the scores, at blocks 705, 709, 713, 717 and 721, of each analysis to reflect the ability of the analysis to reliably identify suspicious programs may be used. Within the scope of the present principles any such methods are also contemplated as weightings, or importance factors, as well.

In embodiments, the weightings applied to each analysis may be predefined. In other embodiments, the weightings may be adjustable by a user. In an embodiment, each analysis may have a different weighting, such that for example, a program's graph structure may be more heavily weighted than the program's verification status.

In an embodiment, several thresholds may be provided at block 729 such that a failure to exceed a first (e.g. lowest threshold) may result in quarantining of the program on all user machines 2. While failure to exceed a second threshold may place a program on a watchlist. Failure to exceed a third threshold may flag the program for scrutiny and determination by the cyber security department of the enterprise. A program that surpasses the third threshold in block 729 may be placed on a whitelist. In this way the cyber security team will be able to focus on the group of watchlisted and flagged programs.

In an embodiment of the present principles, the one or more thresholds are manually adjustable by an IT administrator to tailor the categorizing of the programs based on the enterprise's risk tolerance, for example. Alternatively, the thresholds are set to automatic or default values.

In still another embodiment, an IT administrator is presented with several predefined risk levels to choose from, such as "HIGH", "MEDIUM" and "LOW". Selection of one of these risk levels will appropriately set threshold values to reflect the selection. For example, a selection of the "HIGH" risk level will set the threshold to a high value so that only verifiably safe executables are allowed, and all others will either be quarantined or may need individual evaluation. While only three risk levels are discussed here, it is understood that any number of risk levels may be implemented without departing from the present principles.

Figure 8:
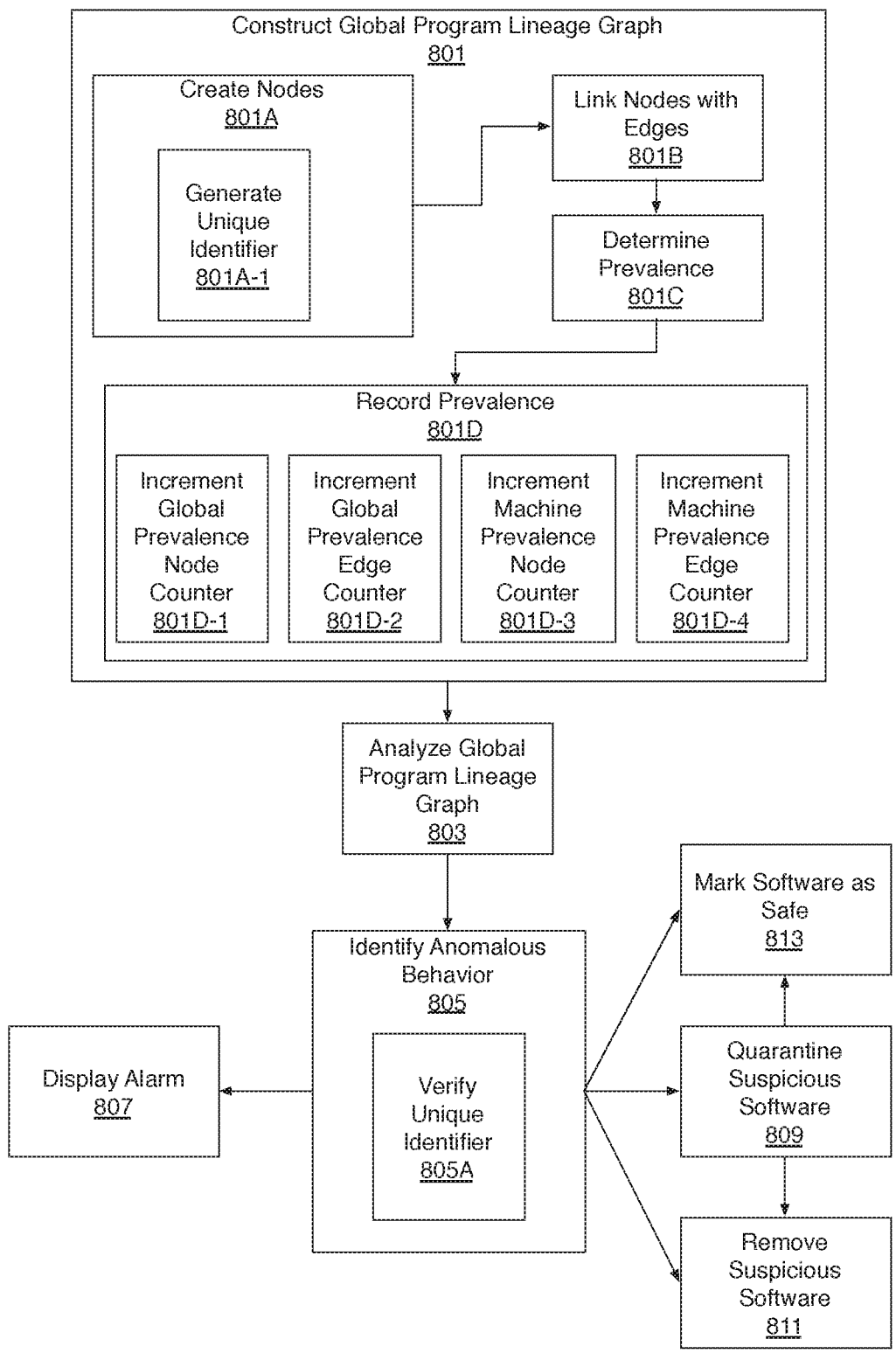
FIG. 8 is a block/flow diagram illustrating a system/method for path-based program lineage inference analysis, in accordance with an embodiment.

In an embodiment, as shown in FIG. 8, a system (supervisory machine 6) or method utilizes a processor 62 and storage/memory 64 to construct a global program lineage graph at block 801 by creating a node in block 801A for each version of a program that has been installed on a set of user machines 2, the node includes metadata, implemented in memory 64, associated with the respective version of the program, and is identified by a unique identifier. In an embodiment, the unique identifier is a program signature. Moreover, in an embodiment, each unique identifier is generated by the processor 62, in block 801A-1 by applying a hash function to the respective version of the program.

Additionally, creation of the global program lineage graph, at block 801, includes instructing the processor 62 to link at least two nodes with a directional edge at block 801B. The directional edge represents a progression from a first version of the program (e.g., a first node) to a next version of the program (e.g., a second node) based on an event time of each version of the program.

Creation of the global program lineage graph, at block 801, also includes instructing the processor 62 to determine, for each version of the program, a prevalence number, in block 801C, of the set of user machines 2 on which each version of the program had been installed, and recording the prevalence number to the metadata associated with the respective node in block 801D. In an embodiment, determining the prevalence number, in block 801D, includes incrementing a global prevalence node counter implemented in memory 64, in block 801D-1, for each appearance of the version of the program on the set of user machines 2. In an embodiment, determining the prevalence number, in block 801D, also includes incrementing a global prevalence edge counter implemented in memory 64, in block 801D-2, for each appearance of respective directional edges on the set of user machines 2. The global prevalence edge counter may be stored in metadata, implemented in memory 64, and associated with the respective directional edge.

In an embodiment, determining the prevalence number, in block 801D, includes incrementing a machine prevalence node counter implemented in memory 64, in block 801D-3, for each user machine 2 of the set of user machines 2 on which the respective version of the program appears. In an embodiment, determining the prevalence number, in block 801D, includes incrementing a machine prevalence edge counter implemented in memory 64, in block 801D-4, for each user machine 2 of the set of user machines 2 on which respective directional edges appear. The machine prevalence edge counter may be stored in metadata implemented in memory 64, and associated with the respective directional edge.

Once the global program lineage graph is constructed in block 801, the processor 62 analyzing the global program lineage graph in block 803. Analyzing the global program lineage graph in block 803 is described in greater detail above with respect to FIG. 7. As shown in FIG. 7, various analyses are performed with respect to the structure of the global program lineage graph and the metadata contained within the respective nodes and directional edges. Each of the analyses (reflected in blocks 703, 707, 711, 715 and 719) are assigned scores (reflected in blocks 705, 709, 713, 717 and 721, respectively), which are combined to create a total score at block 723.

Turning back to FIG. 8, the results of the analysis performed by the processor 62 in block 803 are used by the processor 62 for identifying anomalous behavior, in block 805. The anomalous behavior may be based at least on structures formed by the at least two nodes and associated directional edge in the global program lineage graph. The anomalous behavior identified by the processor 62 in block 805 is indicative of a suspicious software. In an embodiment, identifying anomalous behavior may also include verifying the unique identifier of each node, in block 805A.

The identification of program versions as suspicious software, by the processor 62 in block 805, triggers an alarm condition in 807. Thus, for each suspicious software based on the identified anomalous behavior, an alarm may be displayed on a graphical user interface of a display screen 66 in block 807.

By presenting an operator with a subset of programs installed in an enterprise environment, malicious programs may be more quickly quarantined, in block 809, and removed, in block 811, thus limiting the impact of the malicious program on the enterprise systems. In an embodiment the systems and methods executing the present principles, as shown in FIG. 8 may automatically quarantine suspicious software that meets a first suspiciousness threshold, in block 809. In an embodiment the systems and methods may remove (e.g., uninstall) suspicious software that meets a second suspiciousness threshold. In an embodiment the systems and methods may provide an interface for an operator to evaluate the quarantined suspicious software, in block 809, and make a determination whether to remove the suspicious software by passing the suspicious software to block 811, or remove the quarantined suspicious software, in block 809, from quarantine, by marking the software as safe, in block 813. The operator interacts with the quarantined suspicious software by way of a user input interface 64, that may include a keyboard, mouse and/or touch input component of the display screen 66.

The terms application, executable, program and program binary, as used herein, are considered essentially interchangeable. However, an application may include multiple executables or program binaries, as well as supporting files, such as libraries, configuration files, and data files, necessary for the proper functioning of the application.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention.

Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for securing an enterprise environment by detecting suspicious software, comprising:
constructing a global program lineage graph comprising:
creating a node for each version of a program installed on a set of user machines, the node including metadata including an event time associated with the respective version of the program, each node being identified by a unique identifier, wherein the same version of the program installed on different user machines has the same node on the global lineage graph, the version of the program determined by an identifier unique to the version and program combination,
linking at least two nodes with a directional edge, the directional edge representing a progression from a first version of the program to a next version of the program based on the event time of each version of the program, and
determining, for each version of the program, a prevalence number of the set of user machines on which each version of the program had been installed and recording the prevalence number to the metadata associated with the respective node;
identifying anomalous behavior, indicative of a suspicious software, based on structures formed by the at least two nodes and associated directional edge in the global program lineage graph; and
displaying an alarm on a graphical user interface for the suspicious software indicated by the identified anomalous behavior.

2. The computer-implemented method as recited in claim 1, wherein identifying anomalous behavior further comprises verifying the unique identifier of each node, the unique identifier being a program signature.

3. The computer-implemented method as recited in claim 1, further comprising generating each unique identifier by applying a hash function to the respective version of the program.

4. The computer-implemented method as recited in claim 1, wherein determining the prevalence number includes incrementing a global prevalence node counter for each appearance of the version of the program on the set of user machines.

5. The computer-implemented method as recited in claim 1, wherein determining the prevalence number includes incrementing a global prevalence edge counter for each appearance of respective directional edges on the set of user machines.

6. The computer-implemented method as recited in claim 1, wherein determining the prevalence number includes incrementing a machine prevalence node counter for each user machine of the set of user machines on which the respective version of the program appears.

7. The computer-implemented method as recited in claim 1, wherein determining the prevalence number includes incrementing a machine prevalence edge counter for each user machine of the set of user machines on which respective directional edges appear.

8. A supervisory machine for securing an enterprise environment by detecting suspicious software, the supervisory machine being in electrical communication with one or more user machines, the supervisory machine comprising:
a storage device configured to store program lineage data received from the one or more user machines, and a global program lineage graph;
a processor operatively coupled to the storage device and configured to detecting suspicious software by executing program code, stored on the storage device, to:
construct the global program lineage graph, the global program lineage graph including: a node for each version of a program installed on a set of user machines, the node including metadata including an event time associated with the respective version of the program, wherein the same version of the program installed on different user machines has the same node on the global lineage graph, the version of the program determined by an identifier unique to the version and program combination, each node being identified by a unique identifier, and a directional edge linking at least two nodes, the directional edge representing a progression from a first version of the program to a next version of the program based on the event time of each version of the program,
determine, for each version of the program, a prevalence number of the set of user machines on which each version of the program had been installed and record the prevalence number to the metadata associated with the respective node, and
identify anomalous behavior, indicative of a suspicious software, based on structures formed by the at least two nodes and associated directional edge in the global program lineage graph; and
a display screen having a graphical user interface implemented by the processor and displayed on the display screen, the graphical user interface configured to present an alarm for the suspicious software indicated by the identified anomalous behavior.

9. The supervisory machine as recited in claim 8, wherein the processor verifies the unique identifier of each node, the unique identifier being a program signature.

10. The supervisory machine as recited in claim 8, wherein the processor generates the unique identifier by applying a hash function to the respective version of the program.

11. The supervisory machine as recited in claim 8, wherein the processor determines the prevalence number by incrementing a global prevalence node counter for each appearance of the version of the program on the set of user machines.

12. The supervisory machine as recited in claim 8, wherein the processor determines the prevalence number by incrementing a global prevalence edge counter for each appearance of respective directional edges on the set of user machines.

13. The supervisory machine as recited in claim 8, wherein the processor determines the prevalence number by incrementing a machine prevalence node counter for each user machine of the set of user machines on which the respective version of the program appears.

14. The supervisory machine as recited in claim 8, wherein the processor determines the prevalence number by incrementing a machine prevalence edge counter for each user machine of the set of user machines on which respective directional edges appear.

15. A computer program product comprising a non-transitory computer readable storage medium having program instructions embodied therewith, the program instructions executable by a computer to cause the computer to perform a method for securing an enterprise environment by detecting suspicious software, comprising:

constructing a global program lineage graph comprising:
creating a node for each version of a program installed on a set of user machines, the node including metadata including an event time associated with the respective version of the program, each node being identified by a unique identifier, wherein the same version of the program installed on different user machines has the same node on the global lineage graph, the version of the program determined by an identifier unique to the version and program combination,
linking at least two nodes with a directional edge, the directional edge representing a progression from a first version of the program to a next version of the program based on the event time of each version of the program, and
determining, for each version of the program, a prevalence number of the set of user machines on which each version of the program had been installed and recording the prevalence number to the metadata associated with the respective node;
identifying anomalous behavior, indicative of a suspicious software, based on structures formed by the at least two nodes and associated directional edge in the global program lineage graph; and
displaying an alarm on a graphical user interface for the suspicious software indicated by the identified anomalous behavior;
for the suspicious software indicated by the identified anomalous behavior.

16. The computer program product as recited in claim 15, wherein identifying anomalous behavior further comprises verifying the unique identifier of each node, the unique identifier being a program signature.

17. The computer program product as recited in claim 15, wherein determining the prevalence number includes incrementing a global prevalence node counter for each appearance of the version of the program on the set of user machines.

18. The computer program product as recited in claim 15, wherein determining the prevalence number includes incrementing a global prevalence edge counter for each appearance of respective directional edges on the set of user machines, the global prevalence edge counter being stored in metadata associated with the respective directional edge.

19. The computer program product as recited in claim 15, wherein determining the prevalence number includes incrementing a machine prevalence node counter for each user machine of the set of user machines on which the respective version of the program appears.

20. The computer program product as recited in claim 15, wherein determining the prevalence number includes incrementing a machine prevalence edge counter for each user machine of the set of user machines on which respective directional edges appear.

* * * * *